United States Patent Office
2,870,147
Patented Jan. 20, 1959

2,870,147

MORPHOLINE ETHERS

Howard B. Wright and Marjorie B. Moore, Waukegan, Ill., assignors to Abbott Laboratories, North Chicago, Ill., a corporation of Illinois No Drawing. Application November 29, 1954
Serial No. 471,927

12 Claims. (Cl. 260—247.5)

The present invention relates to morpholine ethers and more particularly to alkoxy phenylaminophenyl ethers of morpholinoalkanols.

The ethers of our invention have the general formula

M—R—O—Ar wherein M is a morpholine group, R is a lower alkylene group, and Ar is a phenylaminophenyl group. The morpholino group, as used herein, is the group $O(CH_2CH_2)_2N$—

In general, the compounds of the present invention are prepared by forming an alkali or alkaline earth metal salt of a hydroxy aryl compound, and reacting the resultant salt of the hydroxy compound with a morpholino alkyl halide to produce the corresponding aryl ether of the morpholinoalkanol.

The invention is illustrated by the following specific examples:

EXAMPLE I

γ-Morpholinopropyl 4-phenylaminophenyl ether

About 2.8 g. of potassium hydroxide is dissolved in about 150 cc. of refluxing ethanol and then about 9.2 g. of the p-hydroxy diphenylamine is added to the alcoholic solution. As soon as the said p-hydroxy diphenylamine is dissolved, about 8.1 g. of γ-morpholinopropyl chloride dissolved in about 50 cc. of ethanol is added to the refluxing solution and the solution is refluxed for about 24 hours and cooled. The product is recovered by filtering the reaction mixture and removing the solvent by vacuum distillation. The oily residue is acidified and shaken with ether. The acidic phase is made strongly alkaline with 40% sodium hydroxide and the oil which separates is extracted with ether. The ethereal phase is dried and the solvent removed by vacuum distillation. The residue product is distilled at a temperature of 238–240° C. at a pressure of 3.7 mm. to give the base, γ-morpholinopropyl 4-phenylaminophenyl ether.

The hydrochloride salt of the foregoing base is prepared by dissolving the base in ether and acidifying with hydrochloric acid and the crystalline salt recovered therefrom is found to have a melting point of 208–210° C.

EXAMPLE II

γ-Morpholinopropyl 3-phenylaminophenyl ether

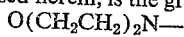

Abou 9.2 g. of m-hydroxyphenylamine is refluxed in 200 cc. of ethanol containing 2.8 g. of potassium hydroxide and a trace of sodium hydrosulfite. After refluxing for 24 hours the solution is cooled and filtered. The filtrate is treated as in Example I. The residue obtained after removing the ether-benzene solvent is recrystallized from petroleum solvent and upon drying yields the solid γ-morpholinopropyl 3-phenylaminophenyl ether having a melting point of 80–81° C. Upon chemical analysis the base is found to contain 73.33% C and 7.50% H as compared with a theoretical analysis of 73.04% C and 7.74% H.

EXAMPLE III

γ-Morpholinopropyl 2-phenylaminophenyl ether

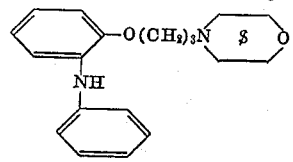

The base γ-morpholinopropyl 2-phenylaminophenyl ether is prepared as in Example I using o-hydroxydiphenylamine in place of p-hydroxydiphenylamine. The product distills at a temperature of 255–257° C. at a pressure of 5.0 mm. and is found to have on chemical analysis 73.20% C and 7.48% H as compared with a theroetical analysis of 73.04% C and 7.74% H.

EXAMPLE IV

γ-Morpholinopropyl 4-phenylmethylaminophenyl ether

The base, γ-morpholinopropyl 4-phenylaminophenyl ether as produced in Example I, is refluxed in 250 cc. of alcohol with a trace of sodium hydrosulfite and 0.9 g. of sodium is added. Thereafter 3.0 g. of methyl iodide dissolved in a small amount of ethanol is dropped into the reaction mixture rapidly. The mixture is refluxed for about 4.5 hours and cooled. The precipitate is filtered off and the benzene is removed under vacuum and the residue again filtered. The filtrate is distilled and a fraction isolated having a boiling point of 104–112° C. at a pressure of 1.8 mm. which solidifies on standing. The solid is triturated with dry ether and dried on a sintered glass funnel. The solid is recrystallized twice from petroleum solvent and dried to give the base γ-morpholinopropyl 4-phenylmethylaminophenyl ether having a melting point of 52–53° C. On chemical analysis the base is found to contain 73.46% C and 7.75 H as compared with a theoretical analysis of 73.58% C and 8.03% H.

The compounds of the invention may also be prepared by refluxing in a dry solvent an ω-haloalkyl aryl ether with morpholine. The hydrohalide salt is then separated by suitable means and the desired ether recovered.

The ω-haloalkyl aryl ethers for the starting materials may be obtained by the usual methods, as by the reaction of the sodium salt of the aryl hydroxide with an alkyl dihalide. Similarly, the sodium salt of the aryl hydroxide may be reacted with a halohydrin, and the resulting ω-hydroxyalkyl aryl ether is further reacted with a phosphorus or thionyl halide or a halogen acid to give the desired ω-haloalkyl aryl ether. The reaction of the ω-haloalkyl aryl ether with morpholine gives the desired alkamine ether.

Still another method of preparing the compounds of the present invention comprises reacting an alkali metal in a finely divided form, such as a dispersion of sodium in toluene, with the desired aryl phenol to form the alkali metal salt of the hydroxy aryl compound and treating the said alkali metal salt with a lower alkyl dihalide, such as 1-chloro-3-bromo-propane or 1,3-dibromo-propane, to form the halide of the aryl alkyl ester and reacting the said halide with morpholine to produce the desired morpholino ether. It should be understood that in place of the alkali metal one can use an alcoholate or alkali metal hydride to prepare the alkali metal salts of the desired hydroxy aryl compound.

The salts are generally prepared by dissolving the products (which are bases) in a solvent and adding an acid, which precipitates the salt. For example, by dissolving γ-morpholinopropyl 4-phenylaminophenyl ether in dry ether and adding a solution of hydrochloric acid, sulfuric acid, citric acid, or picric acid, the hydrochloride, sulfate, citrate, or picrate salt, respectively, of the γ-morpholinopropyl 4-phenylaminophenyl ether is formed. Similarly, the salts of the other named bases may be prepared.

While in the preceding specific examples of the morpholino ethers of the present invention R is shown as a bivalent hydrocarbon group having three carbon atoms, it should be understood that other bivalent lower hydrocarbons can be used with equal facility. Thus, R can be any lower bivalent hydrocarbon group, including the bivalent ethyl, butyl, and amyl groups. And, to prepare the corresponding ethyl, butyl, or amyl congeners of the phenylaminophenyl ethers of the preceding examples, one uses in place of the γ-morpholinopropyl halide of Example I the following compounds: β-morpholinoethyl chloride, δ-morpholinobutyl chloride, and ε-morpholinoamyl chloride, respectively, to produce the compounds β-morpholinoethyl 4-phenylaminophenyl ether, δ-morpholinobutyl 4-phenylaminophenyl ether, and ε-morpholinoamyl 4-phenylaminophenyl ether, respectively. To produce the morpholino ethers of the remaining examples, the aforementioned ethyl, butyl, and amyl morpholino halides are likewise used in place of the γ-morpholinopropyl chloride used in Examples II and III.

It should be understood that the phenylaminophenyl group of the compounds of the present invention may be either substituted or unsubstituted with the substituents being preferably not more than three and being either mixed or identical substituents. The substituent groups may be alkyl, alkenyl, nitro, halo, phenyl, hydroxy, alkoxy, morpholinoalkoxy, aralkoxy, and aryloxy.

Compounds of the invention are useful as intermediates for certain organic compounds, and further have utility as local anesthetics, either for surface anesthesia or in wheals for regional anesthesia. Generally, the compounds are used therapeutically in the form of inorganic or organic salts, for example, the hydrochloride, sulfate, citrate, picrate, and the like. Because of the low toxicity and low sensitizing properties of the compounds, such as γ-morpholinopropyl 4-phenylaminophenyl ether, and the very excellent anesthesia produced there is provided by the present invention a superior local anesthetic. Pharmaceutically useful forms of the invention are illustrated by the following specific examples:

EXAMPLE V

A sterile anesthetic solution for irrigation is prepared by admixing the following ingredients in the proportions specified:

| | Percent |
|---|---|
| γ-Morpholinopropyl 4-phenylaminophenyl ether.HCl | 1.0 |
| Benzyl alcohol | 0.9 |
| Water for injection q. s. | |

EXAMPLE VI

A highly effective anesthetic jelly is prepared by combining the following ingredients in the specified proportions

| | Percent |
|---|---|
| γ-Morpholinopropyl 4-phenylaminoethyl ether.HCl | 1.0 |
| Methocel | 4.25 |
| Propylene glycol | 20.0 |
| Distilled water q. s. | |

EXAMPLE VII

A highly effective anesthetic cream in a water miscible base is prepared by combining the following ingredients in the specified proportions:

| | Percent |
|---|---|
| γ-Morpholinopropyl 4-phenylaminophenyl ether | 1.0 |
| Propylene glycol | 57.0 |
| Carbowax-6000 | 42.0 |

It should also be understood that compounds of the present invention can be prepared in the form of anesthetic lotions, such as incorporating 1% of the γ-morpholinopropyl 4-phenylaminophenyl ether hydrochloride in a calamine, zinc oxide suspension. It is also possible, if desired, to prepare compounds of the present invention dispersed in a solid carrier, such as cocoa butter and spermaceti. In each of the foregoing pharmaceutical preparations it is also possible to incorporate other medicaments therewith, such as an antihistaminic, or sulfa drugs, such as sulfadiazine.

In the present application the term "lower alkylene" is used to designate a bivalent lower hydrocarbon radical other than an alkylidene group or the like in which both valances are taken from the same carbon atom.

This application is a continuation-in-part of applicants' now abandoned co-pending application Serial No. 187,666, filed September 29, 1950.

Other may readily adapt the invention for use under various conditions of service, by employing one or more of the novel features disclosed or equivalents thereof. As at present advised with respect to the apparent scope of our invention, we desire to claim the following subject matter.

We claim:

1. A compound selected from the class consisting of compounds having the general formula

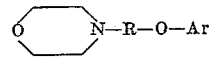

wherein R is a divalent lower saturated aliphatic hydrocarbon group having at least 2 carbon atoms in the carbon chain, and Ar is a group selected from the class consisting of a phenylaminophenyl group and a lower alkyl substituted phenylaminophenyl group, and the salts thereof.

2. The ω-N-morpholino-lower alkylene phenylaminophenyl ether wherein the said alkylene group has at least 2 carbon atoms in the carbon chain.

3. An acid addition salt of ω-N-morpholino-lower alkylene phenylaminophenyl ether wherein the said alkylene group has at least 2 carbon atoms in the carbon chain.

4. The γ-N-morpholinopropyl phenylaminophenyl ether.

5. The compound γ-N-morpholinopropyl 4-phenylether.

6. The hydrochloride salt of γ-N-morpholinopropyl 4-phenylaminophenyl ether.

7. An acid addition salt of γ-N-morpholinopropyl 4-phenylaminophenyl ether.

8. The compound γ-N-morpholinopropyl 3-phenylaminophenyl ether.

9. The compound γ-N-morpholinopropyl 2-phenylaminophenyl ether.

10. The compound γ-N-morpholinopropyl 4-phenylmethylaminophenyl ether.

11. A process of preparing a compound having the general formula

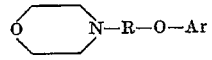

wherein R is a divalent lower saturated aliphatic hydrocarbon group having at least 2 carbon atoms in the carbon chain, and Ar is a group selected from the class consisting of a phenylaminophenyl group and a lower alkyl substituted phenylaminophenyl group; which comprises reacting a metal hydroxide in a lower aliphatic alcohol solvent with an Ar hydroxy compound, and reacting the resultant metal salt of the Ar hydroxy compound with an ω-N-morpholino lower alkyl halide to produce the corresponding ether of ω-N-morpholino lower alkanol.

12. The process which comprises refluxing potassium hydroxide in a lower aliphatic alcohol solvent with p-hydroxydiphenyl amine, and adding γ-N-morpholinopropyl chloride to the refluxing mixture to produce γ-N-morpholinopropyl 4-phenylaminophenyl ether.

References Cited in the file of this patent

UNITED STATES PATENTS

| | | |
|---|---|---|
| 2,484,621 | Hardman | Oct. 11, 1949 |
| 2,679,501 | Wenner | May 25, 1954 |

FOREIGN PATENTS

| | | |
|---|---|---|
| 130,555 | Australia | Nov. 28, 1946 |

OTHER REFERENCES

Idson: Chemical Reviews, vol. 47, Number 3, pages 419–420, September 12, 1950.